United States Patent [19]
Fourneau et al.

[11] 3,876,784
[45] Apr. 8, 1975

[54] A THERAPEUTIC METHOD UTILIZING A CHOLERETICALLY ACTIVE COMPOSITION CONTAINING A MORPHOLINO DERIVATIVE

[75] Inventors: Jean-Pierre Fourneau; Jean DeLourme, both of Paris, France

[73] Assignee: Laboratoires Houde, Paris, France

[22] Filed: Sept. 25, 1972

[21] Appl. No.: 292,099

Related U.S. Application Data
[62] Division of Ser. No. 856,518, Aug. 4, 1969, abandoned.

[30] Foreign Application Priority Data
Aug. 6, 1968 France .............................. 68.161993

[52] U.S. Cl. .................................... 424/248
[51] Int. Cl. ............................. A61k 27/00
[58] Field of Search .................................... 424/248

[56] References Cited
UNITED STATES PATENTS
3,160,557   12/1964   Mauvernay ........................ 424/248
3,228,961   1/1966   Vargha et al. ................... 260/326.3

*Primary Examiner*—Sam Rosen
*Attorney, Agent, or Firm*—Zalkind, Horne & Shuster

[57] ABSTRACT

A therapeutic composition having, in particular, a choleretic action, comprising 2-morpholino-ethyl O-acetylvanillate of formula

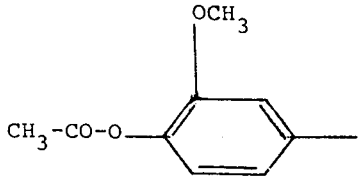
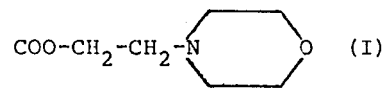

or a pharmaceutically acceptable acid addition salt thereof.

3 Claims, No Drawings

A THERAPEUTIC METHOD UTILIZING A CHOLERETICALLY ACTIVE COMPOSITION CONTAINING A MORPHOLINO DERIVATIVE

This application is a Division of our application Ser. No. 856,518, filed Aug. 4, 1969, now abandoned.

This invention relates to a therapeutic composition having, in particular, a choleretic activity comprising, as active ingredient, 2-morpholino-ethyl O-acetylvanillate of formula

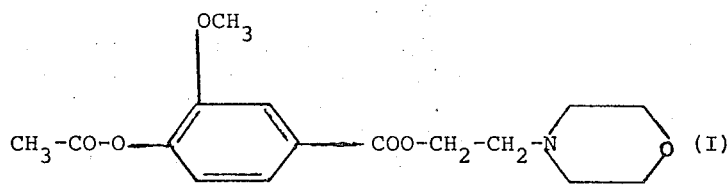

or a pharmaceutically acceptable acid addition salt thereof.

2-morpholino-ethyl O-acetylvanillate and its acid addition salts are new compounds.

Another ester of O-acetylvanillic acid, namely 2-diethylamino-ethyl O-acetylvanillate hydrochloride has already been described as chemical compound but the pharmacological properties as set forth here have never been described heretofore.

Indeed, it was found that 2-morpholino-ethyl O-acetylvanillate and its acid addition salts possess a surprisingly high choleretic activity.

To prepare 2-morpholino-ethyl O-acetylvanillate, O-acetylvanilloyl chloride is condensed with 2-morpholino-ethanol.

This condensation is advantageously carried out in a non-polar solvent such as benzene, with stirring, under moisture free conditions and at room temperature, using the reactants in stoichiometric proportions.

The reaction is generally carried out during 12–24 hours at room temperature, or during several hours at refluxing conditions.

The following example illustrates the preparation of

2-MORPHOLINO-ETHYL O-ACETYLVANILLATE HYDROCHLORIDE

In a 250 ml three-necked flask fitted with a reflux condenser (provided overhead with a calcium chloride trap), a dropping funnel and a good mechanic stirrer, are added 13.7 g (0.06 mole) of O-acetylvanilloyl chloride dissolved in 50 ml of anhydrous benzene. 2-Morpholino-ethanol (7.9 g; 0.06 mole) dissolved in anhydrous benzene (35 ml) is added portionwise through the dropping funnel, with stirring. The reaction mixture is then refluxed during 6 hours. After allowing to rest overnight in the refrigerator, the crystals which have separated are suction filtered and then dried. 14 g of impure 2-morpholino-ethyl O-acetylvanillate hydrochloride are thus obtained.

The material is dissolved in water, made alkaline with sodium bicarbonate and the base is extracted with ether. Evaporation of the solvent leaves 9.4 g of light yellow oily base which is converted to the hydrochloride by addition of the calculated amount of anhydrous hydrochloric acid dissolved in ether. Suction filtering, washing with ether and drying gives 10.2 g of crude hydrochloride melting at 160°C. On recrystallization from 500 ml of acetone to which 50 ml of ether have been added, it melts instantaneously at 161°C (7.8 g; Yield: 36%). It is slightly hygroscopic and soluble in about 5 parts of water.

Analysis

Calculated for $C_{16}H_{22}ClNO_6$: C% 53.40; H% 6.46; Cl% 9.85; N% 3.89

Acute toxicity

The $LD_{50}$ values, in mice, of 2-morpholino-ethyl O-acetylvanillate hydrochloride are: 220 mg/kg by the intra-venous route, 1000 mg/kg by the intraperitoneal route and 2700 mg/kg per os.

Tolerance tests in rat:

1st test: The following dosages were administered by a gastric catheter to a lot of 10 rats:

500 mg/kg daily during 3 days
1000 mg/kg daily during the following 3 days
2000 mg/kg daily during the following 3 days.

The animals were kept under observation during 2 weeks after the end of the treatment, and were then sacrificed and autopsied. No disorder of the behavior, no modification of the weight increase curve with respect to the untreated animals and no alteration of the principal organs were observed.

2nd test: 1 g/kg was administered orally daily to a lot of 5 rats during 5 consecutive days. No weight loss was noted in the treated lot. All animals were sacrificed and autopsied 3 hours after the last administration: no injury of the gastro-intestinal system was detected in the treated animals.

Tolerance tests in dog:

The following dosages were administered orally to 3 beagles:

30 mg/kg daily during 3 days
75 mg/kg daily during the following 3 days
150 mg/kg daily during the following 3 days.

As in rat, no particular symptomatology was noted.

Systemic effects:

As early as the 1 mg/kg i.v. dosage, the compound of example 1 produces in rat a transient hypotension which is proportional to the dosage administered and is non modified by atropine, and a brief stimulation of respiration which may reach 80% after 10 mg/kg. The effects produced by acetylcholine, noradrenaline and isoprenaline on blood pressure are not modified, but adrenaline-induced hypertension is reinforced. Similar phenomena are noted in guinea pig or in rabbit.

The compound prepared in example 1 has no substantial central effects in the following tests: nocturnal activity of mice, potentiation or antagonism on pentobarbital-induced narcosis or on strychnine-, pentetrazole- or electroshock-induced convulsions, or on reserpine-induced ptosis.

150 and 300 mg/kg i.p. lower the central temperature of rat by an average of 2°C during about 20 minutes.

1 g/kg per os protects against tremorine-induced symptoms.

150 and 300 mg/kg per os decrease by 55% the number of "wriggling" fits induced in mice by intraperitoneal injection of acetic acid, which corresponds to an analgesic activity.

On the isolated ileum of guinea-pig, the concentration reducing by 50% the histamine- and barium chloride-induced contractions is $2\times10^{-5}$. Thus, spasmolytic activity is low. Furthermore, the peristalsis of the intestine of guinea-pig in situ is not modified by 5–20 mg/kg i.v., and the intestinal transit in mice is not modified by 40–80 mg/kg per os.

The compound of example 1 has no local anesthetic activity on the cornea of rabbit up to the very high concentration of 4%.

Choleretic activity in rat:

As early as the dosage of 20 mg/kg, the compound of example 1, administered by the intraduodenal route, produces an increase of more than 50% of the biliary rate of flow, with respect to the original rate of flow. With 40 mg/kg, the increase is within 60 and 100%. At the higher dosages (60 and 80 mg/kg), the increase is not proportional to the dosage administered and does not exceed 110%. The compound is at least as active as sodium dehydrocholate which, administered in the same tests at the dosage of 60 mg/kg, increased the rate of flow by 50 to 110%.

Clinical experimentation

The compound was experimented in two different hospital services, the therapeutical preparation being administered in the form of enteric coated tablets containing each 200 mg of active principle.

1. 25 patients were treated with 2–6 tablets daily during a period of time of 10–35 days. The subjects suffered from various functional hepatic disorders, with or without lithiasis of the gallbladder: nausea, epigastric flatulence, alternating diarrhea and constipation, frontal headaches, true migraines, slow digestion, bitter taste in the mouth, anorexia.

Tolerance is excellent. No effect on blood pressure or on sleep was ever noted. The therapeutical composition was well tolerated in the four cases of lithiasis of the gallbladder, without appearance of biliary colic.

The following results were obtained:

Disapperance of symptoms 9
Strong improvement 10
Substantial improvement 6

2. 20 patients suffering from functional hepatic disorders similar to those described above were treated with 6 tablets daily during 10–30 days. The therapeutical composition was perfectly well tolerated, without any side effects on blood pressure or sleep, and excellent results were obtained in 15 cases and substantial results were obtained in 5 cases. The best results were noted in sequelae of cholecystectomy, in simple biliary dyspepsia and true migraines.

It is apparent from the tests reported above that the therapeutical composition may be administered beneficially in human therapeutics, in particular to control the functional disorders due to a hepato-biliary insufficiency such as nausea, epigastric flatulence, alternating diarrhea and constipation, frontal headaches, migraines, slow digestion, bitter taste in the mouth, anorexia, sequelae of cholecystectomy and pains in the right hypochondriac area.

In such applications, the therapeutical composition is advantageously formulated for the oral administration of about 100–1500 mg and, on the average, of 500 mg of active principle per 24 hours, the latter being associated with a vehicle or excipient suitable for such route of administration.

The therapeutical composition may be administered at the rate of 1–3 doses per day during 30 day periods, as liquid formulations such as drops, syrups, elixirs or solutions containing about 1–5% by weight of active principle, or as solid formulations such as tablets, capsules, granules, and the like, each solid unit dose containing, for example, about 100–600 mg of active principle.

An example of formulation of the therapeutical composition is given below:

Enteric coated tablets:

Morpholinoethyl acetylvanillate hydrochloride . . . 200 mg

Excipient: sugar, starch, prepared silica and talc, q.s. for a tablet finished at . . . about 0.42 g Enteric coating: polymethacrylate, q.s.

Having now described our invention, what we claim as new and desire to secure by Letters Patent is:

1. A method of increasing the biliary rate of flow from patients suffering from hepato-biliary insufficiency comprising administering to said patients an effective amount of an active ingredient selected from the group consisting of 2-morpholino-ethyl O-acetylvanillate of the formula

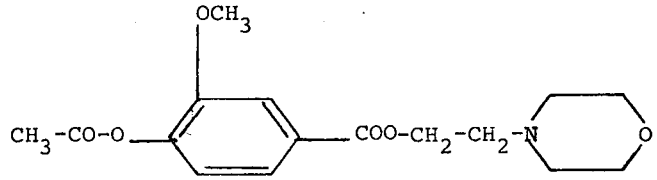

and its pharmaceutically acceptable inorganic acid addition salts.

2. The method as claimed in claim 1, wherein said inorganic acid addition salt is hydrochloride.

3. The method as claimed in claim 1, wherein said effective amount is of from 100 mg to 1500 mg of active ingredient per 24 hours.

* * * * *